United States Patent
Raleigh et al.

(10) Patent No.: US 7,379,494 B2
(45) Date of Patent: *May 27, 2008

(54) MAC PROTOCOL EMPLOYING MULTIPLE DATA RATES

(75) Inventors: Gregory G. Raleigh, El Granada, CA (US); Vincent K. Jones, IV, Redwood City, CA (US); Michael A. Pollack, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 10/956,740

(22) Filed: Oct. 1, 2004

(65) Prior Publication Data

US 2005/0089009 A1    Apr. 28, 2005

Related U.S. Application Data

(63) Continuation of application No. 10/202,496, filed on Jul. 24, 2002, now Pat. No. 6,816,546, which is a continuation of application No. 09/097,305, filed on Jun. 12, 1998, now Pat. No. 6,463,096.

(51) Int. Cl.
*H04B 17/00* (2006.01)
(52) U.S. Cl. .................................. 375/225; 375/221
(58) Field of Classification Search ............... 375/225, 375/221, 257, 260, 295, 263, 265
See application file for complete search history.

(56) References Cited

U.S. PATENT DOCUMENTS

| | | | |
|---|---|---|---|
| 5,481,542 A * | 1/1996 | Logston et al. ............. 725/131 |
| 5,638,412 A * | 6/1997 | Blakeney et al. ............ 375/377 |
| 5,751,708 A * | 5/1998 | Eng et al. ............... 370/395.42 |
| 5,790,514 A * | 8/1998 | Marchok et al. ............. 370/208 |
| 5,875,182 A * | 2/1999 | Hatzipapafotiou .......... 370/321 |
| 6,031,832 A | 2/2000 | Turina |
| 6,069,883 A | 5/2000 | Ejzak et al. |
| 6,075,787 A | 6/2000 | Bobeck et al. |
| 6,088,335 A | 7/2000 | I et al. |
| 6,108,323 A | 8/2000 | Gray |

(Continued)

OTHER PUBLICATIONS

N. Abramson, "The ALOHA System—Another Alternative for Computer Communications," 1970 Fall Joint Computer Conference, AFIPS Conference Proceedings, vol. 37.

(Continued)

*Primary Examiner*—Emmanuel Bayard
(74) *Attorney, Agent, or Firm*—Cindy Kaplan

(57) ABSTRACT

Method and apparatus for combining high data rate traffic and low data rate traffic on a common transmission medium while maximizing efficient use of available spectrum. Since spectrum is an economically valuable resource and transport of data generates revenue, the present invention directly leads to more profitable network operation. The disclosed systems are applicable to both wired and wireless transmission media. In one embodiment, a bandwidth reservation scheme provides that data rate may be varied so that when a particular data communication device is allocated a frame, it is also assigned a data rate for use in that frame. Because bandwidth usage varies with data rate, the division of available spectrum into channels for use by individual data communication devices may also vary among frames.

13 Claims, 7 Drawing Sheets

U.S. PATENT DOCUMENTS

| | | |
|---|---|---|
| 6,122,516 A | 9/2000 | Thompson et al. |
| 6,130,887 A | 10/2000 | Dutta |
| 6,157,623 A | 12/2000 | Kerstein |
| 6,167,270 A | 12/2000 | Rezaiifar et al. |

OTHER PUBLICATIONS

Anthony S. Acampora, "An Introduction to Broadband Networks," 1994, Plenum Press, pp. 52-55.

Karol et al., "An Efficient Demand-Assignment Multiple Access Protocol for Wireless Packet Networks," 1995, ACM/Baltzer Wireless Networks, vol. 1, No. 3, pp. 267-179.

Jacobsen et al., "A Discrete Multitone-based Network Protocol for Multipoint-to-point Digital Communications in the CATV Reverse Channel," May 1995, Canadian Cable Television Association Technical Papers.

Östberg et al., "Multiaccess Methods based on OFDM," Telia Research AB.

Peled et., "Frequency Domain Data Transmission Using Reduced Compuational Complexity Algorithms," Apr. 1980, IEEE Int. Conference acoust., Speech, Signal Processing, Denver Co. pp. 964-967.

* cited by examiner

MAC PROTOCOL EMPLOYING MULTIPLE DATA RATES

STATEMENT OF RELATED APPLICATIONS

The present application is a continuation of U.S. patent application Ser. No. 10/202,496 entitled "MAC PROTOCOL EMPLOYING MULTIPLE DATA RATES," filed on Jul. 24, 2002, which was a continuation of U.S. patent application Ser. No. 09/097,305 entitled "MAC PROTOCOL EMPLOYING MULTIPLE SYMBOL RATES," filed Jun. 12, 1998, now U.S. Pat. No. 6,463,096, both of which are incorporated herein in their entirety for all purposes.

BACKGROUND OF THE INVENTION

The present invention relates to digital communication and more particularly to protocols for communicating data originating from sources having disparate data rates over a shared medium.

Trends in digital communication point toward a common transmission medium providing both high data rate services such as digital video and low data rate services such as voice. Internet access is inherently a mixed service. Upstream requests for information typically include minimal data while downstream traffic may include graphics or even live video.

Specific examples of such a common transmission medium include a wireless local loop (WLL) that substitutes for the local telephone loop and provides additional high data rate services such as video and Internet access. Another example is a CATV network that has been updated to provide high data rate services and voice service.

A key objective is maximizing efficiency in use of bandwidth. The available bandwidth is shared among multiple data communication devices. When a data communication device is allocated all or part of the available bandwidth, it should make efficient use of its allocation. Depending on the protocols and modulation systems used, a certain percentage of the data is devoted to network operation rather than customer service. This is referred to as overhead. Consider a network where packets of information are communicated in successive frames and:

$d_p$=Payload data (bits)—the number of payload bits contained in a frame, r=Data rate (bits/sec), proportional to spectrum used (Hz). Data rate refers to the rate at which information is communicated through the wireless medium. Information rate roughly represents the rate of generation of payload data.

$t_f$=Frame time (sec)—the duration of the smallest unit of time that may be allocated to a data communication device for transmission on the shared medium. Note that a packet of like data, such as voice or data, may be transmitted in a single frame or may be divided among many frames.

$t_g$=Overhead time (sec), including guard time, training, and synchronization that is required for each frame.

The system efficiency associated with the overhead given by $t_g$ is $$\text{eff} = \frac{d_p}{r(t_g + t_f)}.$$ This value of efficiency reaches 100% when the overhead time is zero and the frame time equals the payload data divided by the data rate (when the frame time is exactly the time required to transmit the payload data at the transmission rate).

The network designer is left free to vary frame time to maximize efficiency. However, it is difficult to reconcile the needs of different traffic types. Consider choosing one frame time to accommodate both low information rate voice traffic and high information rate data traffic. Due to transmission latency requirements, voice traffic requires frequent frame transmissions to reduce latency. Hence, voice requires a short frame time. Furthermore, the amount of data to be sent in these frames is small since voice is low information rate. If long frames are sent, voice traffic is insufficient to fill each frame, resulting in wasted bandwidth. However, sending small frames incurs a different type of bandwidth loss. The fixed overhead associated with each frame substantially reduces spectral efficiency. This becomes particularly significant for high information rate traffic, where data must be divided over many frames instead of being efficiently transmitted in long frames. This conflict can be described in an example.

Consider choosing a frame time to efficiently transmit both a 64-byte voice packet and a 1000-byte data packet. Assume an overhead time of 3 us ($t_g$=3 us), a data rate of 30 Mbits/sec, and two candidate frame times of 17 us and 267 us. For a frame time of 17 us, the efficiency for a 64-byte packet of data is, $$\text{eff}_{64} = \frac{d_p}{r(t_g + t_f)} = \frac{512}{30 \times 10^6((3+17) \times 10^{-6})} = \frac{17}{3+17} = 85\%.$$

Since the frame time is exactly the amount of time required to transmit 64 bytes at a 30 Mbit/sec rate, this is the maximum efficiency at this data rate. A 1000-byte packet would be spread among 64-byte transmission opportunities corresponding to individual frames. Hence the efficiency for a 1000 byte packet is approximately the same as for the 64-byte packet. (To be precise, the efficiency is slightly less than 85% since the final frame is not fully utilized.)

Increasing the frame time can increase this efficiency by reducing the overhead. For example, a frame time of 267 us results in close to 99% efficiency for a 1000 byte packet, $$\text{eff}_{1000} = \frac{d_p}{r(t_g + t_f)} = \frac{8000}{30 \times 10^6((3+267) \times 10^{-6})} = \frac{267}{3+267} = 99\%.$$

Unfortunately, this large frame time causes severe inefficiency for the 64-byte packet because a large portion of the frame is left unutilized. Here it is assumed that because of latency requirements, it is not feasible to collect multiple 64-byte packets to fill a frame. For example, it would take a 64 kbps voice source over 125 ms to fill a 1000-byte frame, which results in intolerable latency. Allowing 8 ms of latency for the collection of one 64-byte packet, the long frame capable of support6ing 1000 bytes which carries 64-byte packet has very poor efficiency:

$$\mathit{eff}_{64} = \frac{d_p}{r(t_g + t_f)} = \frac{512}{30 \times 10^6 ((3 + 267) \times 10^{-6})} = \frac{17}{3 + 267} = 6\%.$$

No single choice of frame time leads to efficient use of the spectrum for both high data rate and low data rate traffic.

SUMMARY OF THE INVENTION

The present invention provides methods and apparatus for combining high data rate traffic and low data rate traffic on a common transmission medium while maximizing efficient use of available spectrum. Since spectrum is an economically valuable resource and transport of data generates revenue, the present invention directly leads to more profitable network operation. The systems and methods provided by the present invention are applicable to both wired and wireless transmission media. In one embodiment, a bandwidth reservation scheme provides that data rate may be varied so that when a particular data communication device is allocated a frame, it is also assigned a data rate for use in that frame. Because bandwidth usage scales with data rate, individual data communication devices will be assigned to possibly different spectrum bandwidth on a frame-by-frame basis.

A first aspect of the present invention provides a method for allocating access to a common transmission medium among a plurality of data communication devices. The method includes steps of: assigning a transmission frame to a particular data communication device, assigning a data rate for the particular data communication device to employ in the transmission frame, and transmitting the transmission frame assignment and the data rate assignment to the particular data communication device.

A second aspect of the present invention provides an alternative method for allocating access to a common transmission medium among a plurality of data communication devices. The method includes steps of: receiving access request messages from requesting data communication devices at a hub, the access request messages requesting access to the common transmission medium, in response to the access request messages, at the hub, allocating access to the common transmission medium in both the frequency and time domain among the requesting data communication devices, and thereafter transmitting from the hub to the requesting access devices, instructions for each requesting access device to transmit at particular times, and at particular data rates chosen according to the allocating step.

A third aspect of the present invention provides a digital communication network including a plurality of data communications devices transmitting via a common transmission medium, and a hub receiving signals from the data communications devices via the common transmission medium. The hub includes: a bandwidth manager that receives access request messages from requesting data communication devices, the access request messages requesting access to the common transmission medium, and that allocates access to the common transmission medium in both the frequency and time domain among the requesting data communication devices. The hub further includes a link supervisor that transmits from the hub to the requesting access devices, instructions for each requesting access device to transmit at particular, and at particular data rates chosen in accordance with allocations by the bandwidth manager.

A fourth aspect of the present invention provides a hub. The hub includes: a receiver that receives signals from the data communications devices via the common transmission medium, a bandwidth manager that receives access request messages from requesting data communication devices, the access request messages requesting access to the common transmission medium, and that allocates access to the common transmission medium in both the frequency and time domain among the requesting data communication devices. The hub further includes a link supervisor that transmits from the hub to the requesting access devices, instructions for each requesting access device to transmit at particular times, and at particular data rates chosen in accordance with allocations by the bandwidth manager.

A fifth aspect of the present invention provides a data communications device for use in a network. The data communications device includes a bandwidth manager that transmits requests for access to a common transmission medium to a hub. The data communications device further includes a link supervisor that receives medium access instructions from the hub, the medium access instructions specifying data rate, transmission time, and transmission frequency for transmissions to the data communications device, and that controls transmission of information via the common transmission medium in accordance with the specified data rate, transmission time, and transmission frequency.

A further understanding of the nature and advantages of the inventions herein may be realized by reference to the remaining portions of the specification and the attached drawings.

DESCRIPTION OF SPECIFIC EMBODIMENTS

Figure 1:
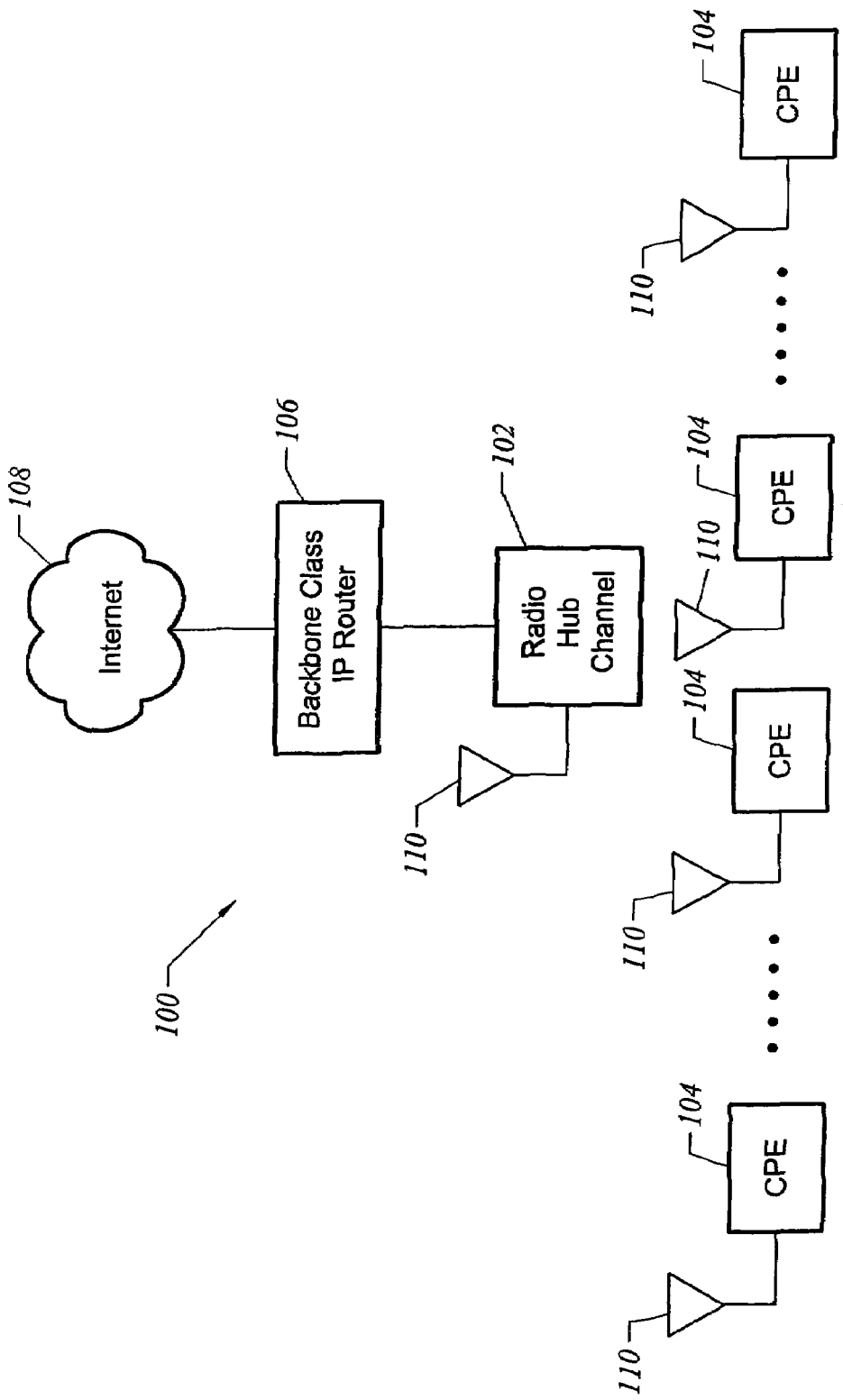
FIG. 1 depicts a representative communications network suitable for implementing one embodiment of the present invention.

FIG. 1 depicts a representative communications network 100 suitable for implementing one embodiment of the present invention. Although communications network 100 is depicted as a wireless network, it will be understood that the present invention is applicable to both wired and wireless networks. A hub 102 acts as a central access point for network 100. Hub 102 may communicate with a plurality of CPEs 104 (customer premise equipment) which represent data communication. devices. A backbone class IP router 106 may interconnect hub 102 and the Internet 108.

In one embodiment, network 100 implements a wireless local loop that provides local telephone services as well as high data rate services. Antennas 110 are used to couple hub 102 and CPEs 104 to the common wireless transmission medium. Spectrum is allocated for the use of network 100. In a preferred embodiment, downstream communications (i.e., communications from hub 102 to CPEs 104) are frequency domain duplexed with upstream communications (from CPEs 104 to hub 102). However, downstream and upstream traffic may also be duplexed in the time domain.

In another embodiment, network 100 is a cable television system. Hub 102 represents the cable head-end and CPEs 104 represent subscriber units coupled to a common coaxial transmission medium interconnecting the networks. The present invention does not assume a particular modulation system. Representative modulation systems include QAM and OFDM.

Figure 2:
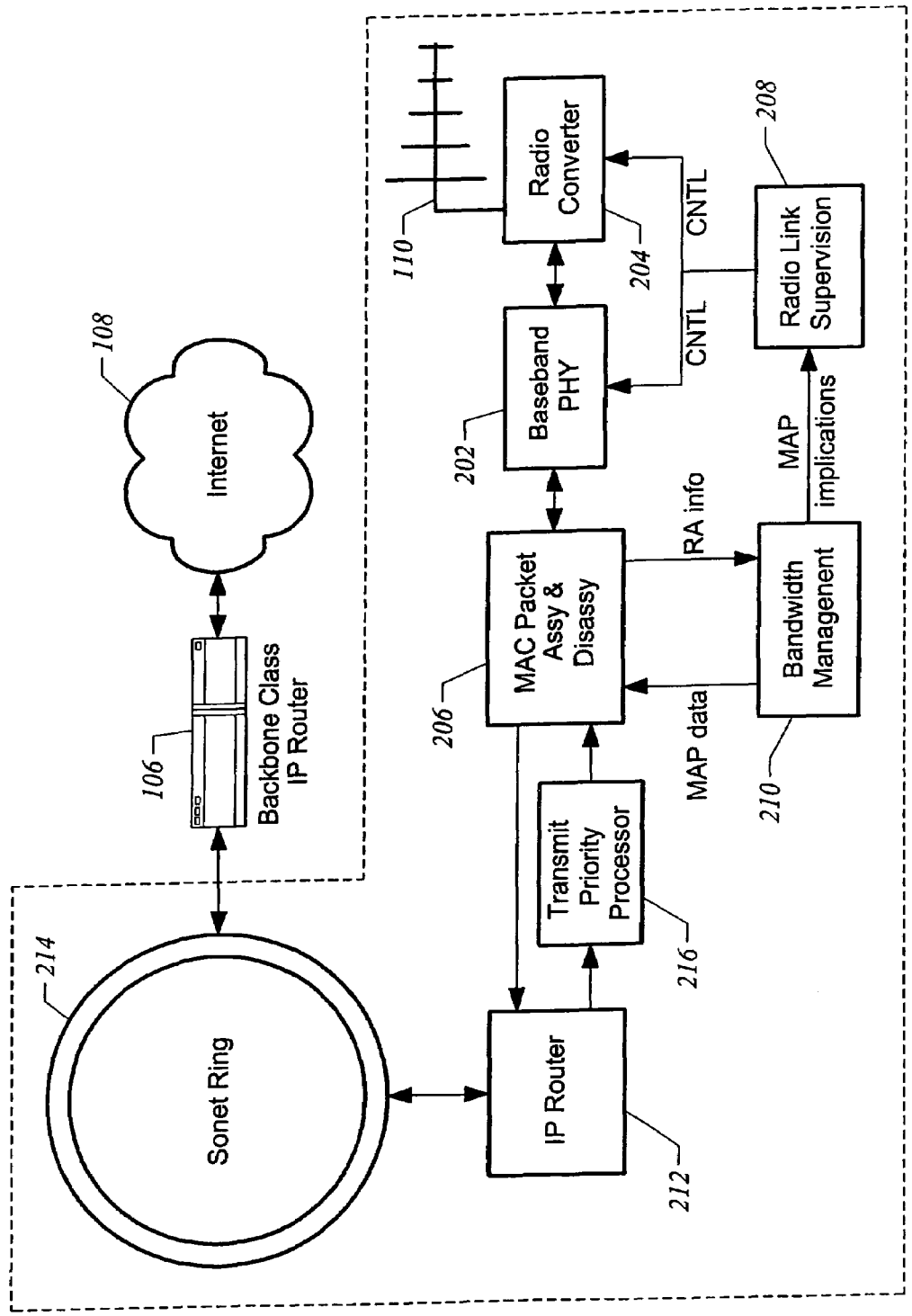
FIG. 2 depicts a hub for the network of FIG. 1 according to one embodiment of the present invention.

FIG. 2 depicts further details of hub 102. In order to interact with the common transmission medium, hub 102 includes a baseband physical layer processor 202 and in some applications such as wireless or cable, a radio converter 204. Baseband physical layer processor 202 includes hardware for implementing error correction coding, and any particular modulation scheme employed such as OFDM or QAM. It is understood that baseband physical layer processor 202 includes hardware and software to support multiple upstream receivers and at least one downstream transmitter. For transmission, radio converter 204 converts the baseband output of baseband physical layer processor 202 to a selected frequency for transmission. For reception, radio converter 204 converts a signal received at a selected reception frequency to baseband for input to baseband physical layer processor 202. Again, it is understood that radio converter 204 includes hardware and software to support multiple upstream receivers and at least one downstream transmitter. Further exemplary detail of these two stages is discussed with reference to FIG. 5.

A MAC processor 206 is responsible for multi-access control processing. MAC processor 206 receives and transmits IP packets to other components of hub 102. MAC processor 206 packages the IP data from the transmit priority processor 216 within the packet format specified by the operative MAC (medium access control) protocol. MAC processor 206 extracts IP data from MAC packets received from baseband physical layer processor 202 and forms the IP packets transmitted on the other end of the link (CPEs). Some of the MAC packets received by MAC processor 206 include access requests from CPEs 104. These access requests are forwarded to a bandwidth management processor 210.

In response to the access requests, a bandwidth management processor 210 allocates available upstream bandwidth among CPEs 104. Any scheduling technique may be used according to the present invention. One consideration in assigning center-frequency is channel quality available at different center-frequencies taking into account signal to noise ratio and/or signal to noise-plus-interference ratio. The bandwidth management processor 210 forwards assignments of frequency, data rate, and transmission frame to MAC processor 206 for inclusion in MAC packets to be transmitted downstream. These assignments of center-frequency, data rate, and transmission frame provide the CPEs the information regarding the time-frequency division of the upstream medium. This information is referred to as the MAP.

This MAP information is also forwarded to the radio link supervision processor 208. The radio link supervisor 208 partitions the baseband physical layer processor 202 and the radio converter 204 for proper reception of the upstream according to the MAP information. The operation of bandwidth management processor 210 and radio link supervision processor 208 is highly related. They may operate as either independent or integrated software packages on the same computer system.

An IP router 212 exchanges IP packets with backbone class IP router 106 via a Sonet ring 214. IP router 212 receives the IP packets from the MAC processor 206. IP packets to be transmitted out over network 100 are prioritized by a transmit priority processor 216. For example, voice packets and other real-time data are given a higher priority than other kinds of data. Priority processor 216 queues up IP packets to be transmitted and forwards them to MAC processor 206 in order of priority.

Figure 3:
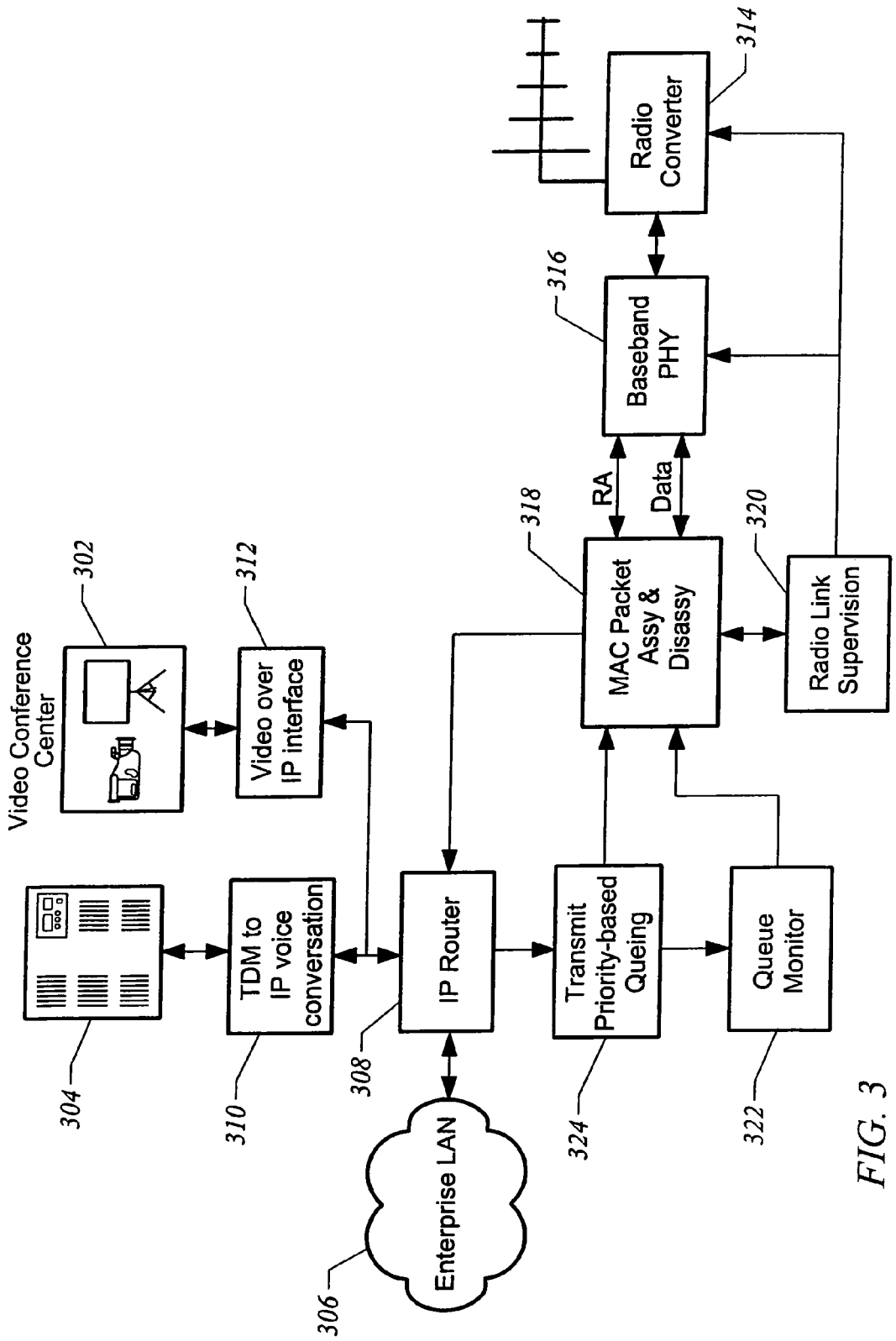
FIG. 3 depicts a data communications device in the network of FIG. 1 according to one embodiment of the present invention.

FIG. 3 depicts a representative CPE 104 as an example of a data communications device in the network of FIG. 1 according to one embodiment of the present invention. A video conference center 302, a PBX 304, and an Enterprise LAN 306 are representative data sources and destinations. An IP router 308 is connected to Enterprise LAN 306, to PBX 304 via a TDM to IP interface 310, and to video conference interface 302 via a video over IP interface 312. A radio converter 314 and a baseband physical layer processor 316 essentially mirror the similarly named components of hub 102. A radio converter 314 and a baseband physical layer processor 316 include hardware and software to support at least one downstream receiver and at least two upstream transmitters or a single upstream transmitter capable of varying its data rate.

A MAC processor 318 operates to assemble and dissemble packets conforming to the operant MAC protocol. Much of the data extracted from the received MAC packets is in the form of IP packets which are forwarded to IP router 308. Some of the extracted data includes the MAP which carries instructions assigning transmission center-frequencies, data rates and frame times. These instructions are forwarded to a radio link supervision processor 320. Radio link supervision processor 320 controls the data rate, transmission times and center-frequencies of operation for baseband physical layer processor 316 and radio converter 314.

A queue monitor 322 originates requests for access to the common transmission medium. These access requests are forwarded to MAC processor 318 for forwarding to hub 102. The requests include the amount and priority of information to be transmitted. IP packets to be transmitted are forwarded to MAC processor 318 from transmit priority processor 324. Transmit priority processor 324 receives packets from IP router 308 that are to be directed to hub 102 and queues them in order of priority. Again, voice and other real-time traffic is given higher priority. Transmit priority processor 324 also indicates when data is to be transmitted and the amount of data to be transmitted to queue monitor 322. It is in response to these inputs that queue monitor 322 generates access requests.

Figure 4A:
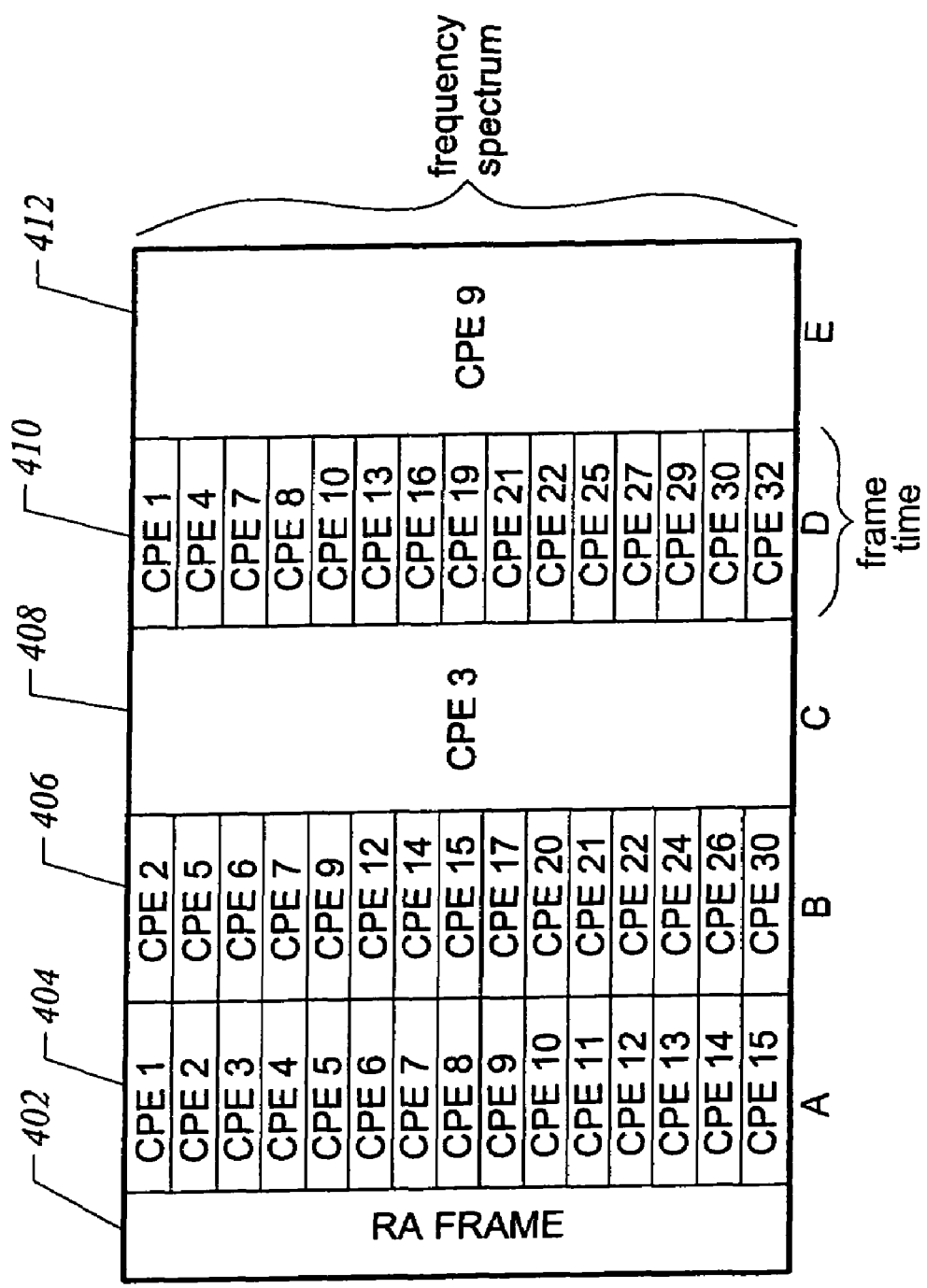
FIG. 4A depicts frame assignments in the time domain according to one embodiment of the present invention.
Figure 4B:
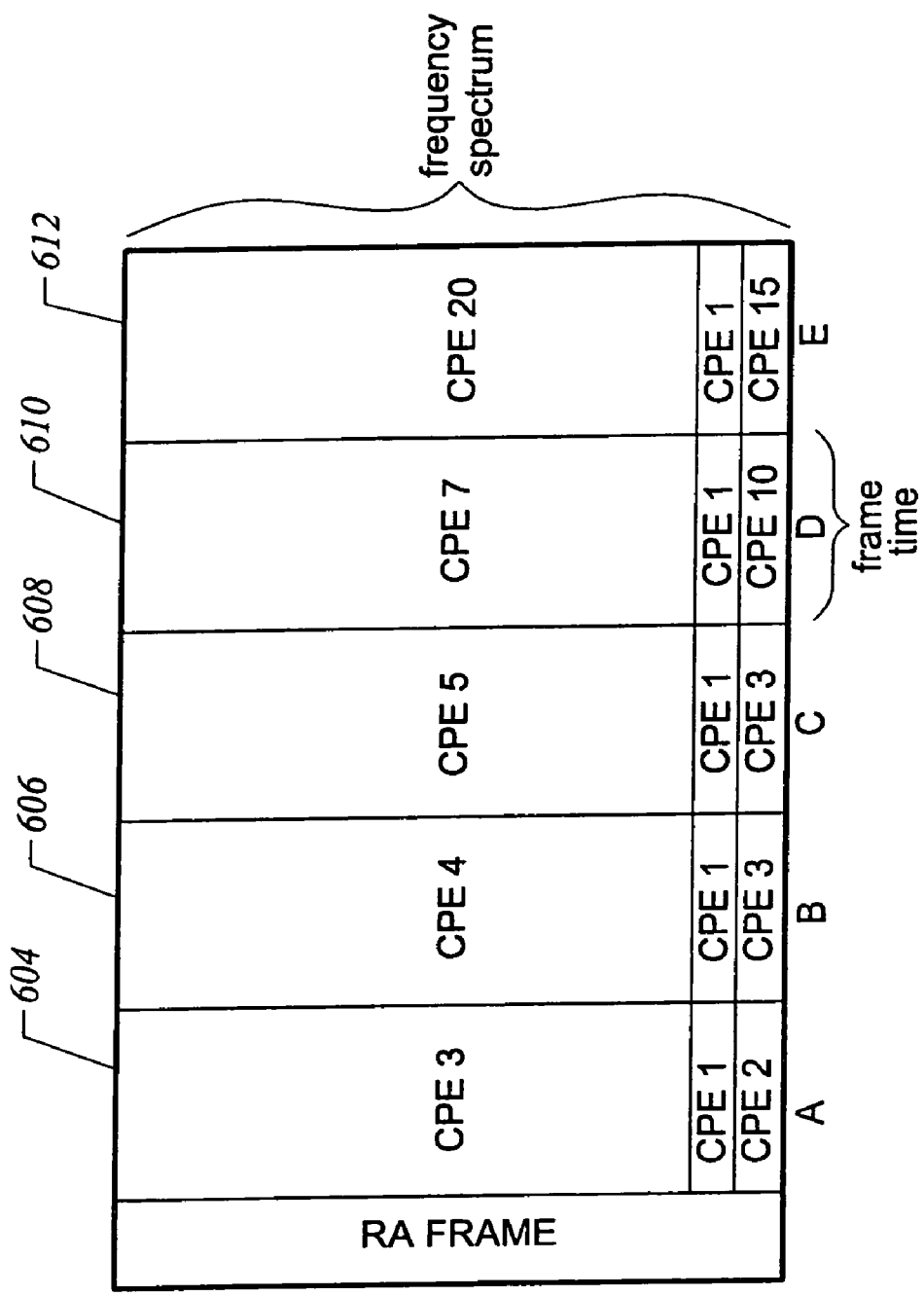
FIG. 4B depicts channel assignments in the frequency domain in a representative frame according to one embodiment of the present invention.

FIG. 4A depicts a MAP with frame, data rate and center-frequency assignments according to one embodiment of the present invention. According to the present invention, the spectrum available for downstream communications is divisible in both the frequency and time domains. FIG. 4A shows a series of frames in the time domain. A frame is here understood to be a unit of time for which access to the common transmission medium may be assigned to one or more CPEs 104. A request access (RA) frame 402 is where individual CPEs may request access to the common transmission medium. Any known MAC scheme may be used to control access to the medium in this frame such as CSMA, CSMA/CD, etc. If RA frame 402 includes an OFDM burst, access contention during RA frame 402 may be ameliorated by assigning different groups of OFDM tones for use by different CPEs 104. This technique is explained in greater detail in the U.S. patent application Ser. No. 09/019,938 entitled MEDIUM ACCESS CONTROL PROTOCOL FOR OFDM WIRELESS NETWORKS filed on Feb. 6, 1998. This application is assigned to the assignees of the present application and its contents are herein incorporated by reference.

In the illustrated example, each CPE 104 may transmit upstream during a given frame at either a 2 Mbps data rate, a 30 Mbps data rate, or not at all. The present invention is, however, not restricted to any particular data rate, or number of possible data rates, or mixtures of data rates in a frame. In an A frame 404, 15 CPEs 1-15 are scheduled to transmit, each transmitting at 2 Mbps at differing center-frequencies. In a B frame 406, a different set of CPEs 2, 5, 6, 7, 9, 12, 14, 15, 17, 20, 21, 22, 24, 26, and 30 are scheduled to transmit. In a C frame 408, the entire upstream spectrum is reserved for a single CPE 3 which transmits at 30 Mbps. In a D frame 410, the upstream spectrum is again divided among 15 CPEs 1, 4, 7, 8, 10, 13, 16, 19, 21, 22, 25, 27, 29, 30, and 32. In an E frame 412, a single CPE 9 occupies the entire upstream spectrum. Thus, many CPEs may simultaneously transmit as low data rate sources or one CPE may transmit at a high data rate. The fluctuations of network traffic are typically such that demand for high data rate transmission is episodic meaning that intermittent high information rate sources may be serviced adequately without compromising the needs of low information rate sources. Assigning frames such as in FIG. 4A is done by bandwidth management processor 210.

In a preferred embodiment, the duration of the 30 Mbps frames is 267 us and each such frame holds a 1000 byte MAC layer packet. The duration of the 2 Mbps frames is 256 us and each CPE transmitting in such a frame transmits a 64 byte MAC layer packet. In an alternative embodiment, frame length is the same for both data rates. Preferably, downstream communications do not share the spectrum employed for upstream communications. However, the downstream communication may be multiplexed in the time domain with the upstream communication. Frames or frequency slots within frames may then be allocated to downstream transmission.

In another preferred embodiment, each CPE 104 may transmit upstream during a given frame at either a 2 Mbps data rate or a 26 Mbps data rate, or not at all. However, the MAP assigns the same number of distinct data rate slots for every frame. This is shown in FIG., 4B, where each frame consists of two 2 Mbps frequency slots and one 26 Mbps frequency slot. This MAP construction simplifies the baseband physical layer processor 202 and 316, along with the radio converter 204 and 314. In an A frame 604, 2 CPEs 1-2 are scheduled to transmit, each transmitting at 2 Mbps at differing center-frequencies. In this same A frame, CPE 3 is scheduled to transmit at 26 Mbps data rate. In a B frame 406, CPEs 1 and 3 are scheduled to transmit at 2 Mbps while CPE 4 transmits at 26 Mbps. Frames C,D and E are used by other CPEs. Note that CPE 1, by use of the MAP, has been allocated a constant data rate channel of 2 Mbps. This MAP assignment is done by bandwidth management processor 210.

Figure 5:
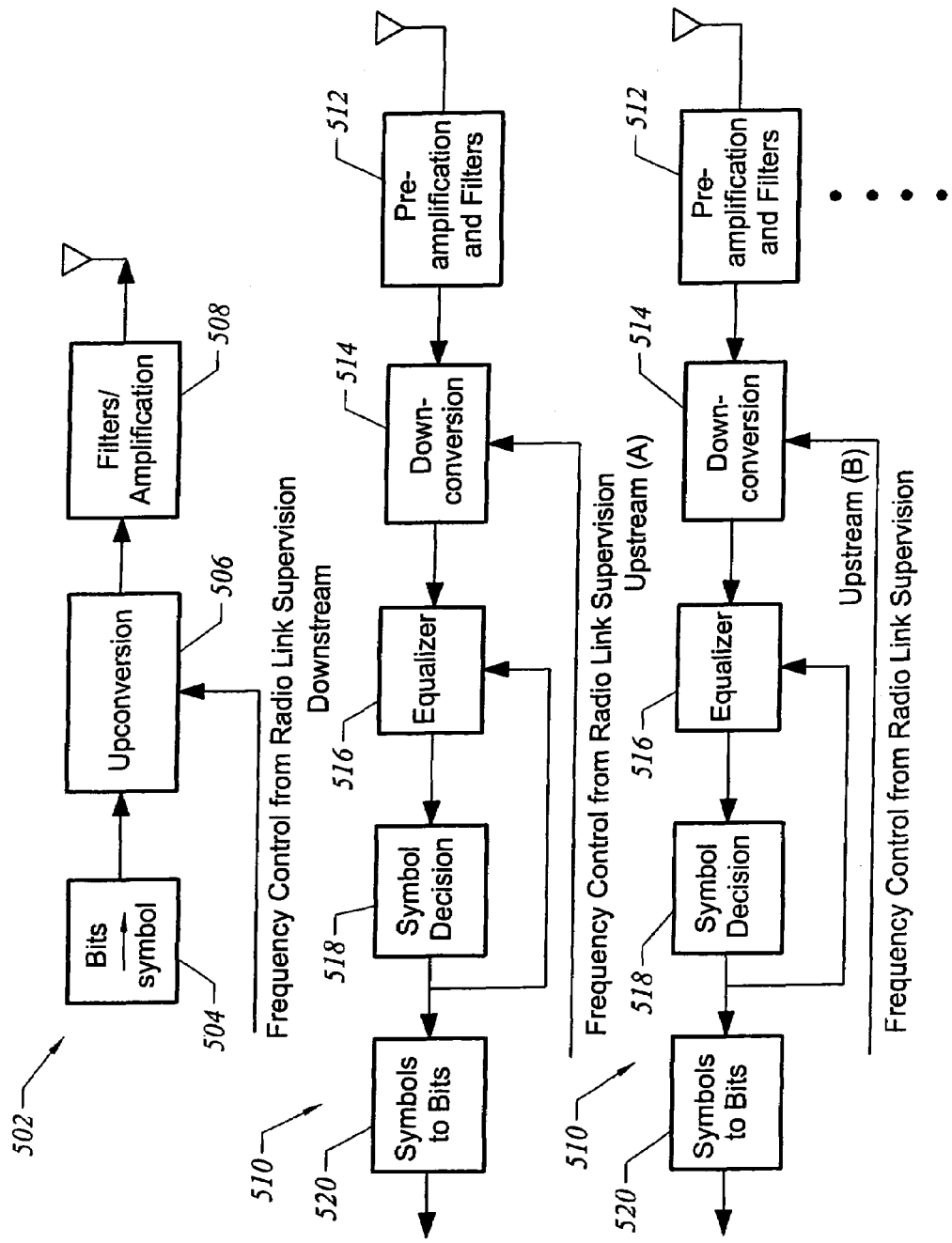
FIG. 5 depicts a hub radio system according to one embodiment of the present invention.

FIG. 5 depicts details of baseband physical processor 202 and radio converter 204 of hub 102. These details are presented for a QAM application, although the present invention is not limited to any particular modulation system. A single downstream system 502 is depicted. Bits corresponding to MAC packet contents are received by bits to symbol converter 504 and mapped to appropriate positions on a QAM constellation. An upconversion stage 506 converts the signal output of bits-to-symbol converter 504 to the frequency allocated for downstream transmission. This frequency may be selected by a signal from radio link supervision processor 208. An amplification and filter stage 508 then outputs the signal onto the common transmission medium. There may of course be more than one such downstream system.

A series of upstream receiver systems 510 are provided. In one embodiment, there are upstream receivers for each possible 2 Mbps channel and a separate receiver for use in frames in which the entire upstream spectrum includes a single 30 Mbps channel. Alternatively, there may be a series of upstream receiver systems 510 with selectable or fully variable data rate. In another embodiment, the entire upstream spectrum is digitized and processed appropriately for each frame.

Each depicted upstream receiver system includes a preamplification and filter stage 512 for receiving a signal from the common transmission medium. A downconversion stage 514 converts the received signal to baseband. Downconversion stage 514 sets the frequency to be received based on frequency control input from radio link supervision processor 208. An equalizer 516 seeks to correct for distortion in the transmission medium. A symbol decision stage 518 estimates the transmitted symbols based on the output of equalizer 516. Equalizer 516 is preferably a decision feedback equalizer (DFE) and adapts in response to the output of symbol decision stage 518. A symbol to bits conversion stage 520 then generates the contents of the MAC packets.

Figure 6:
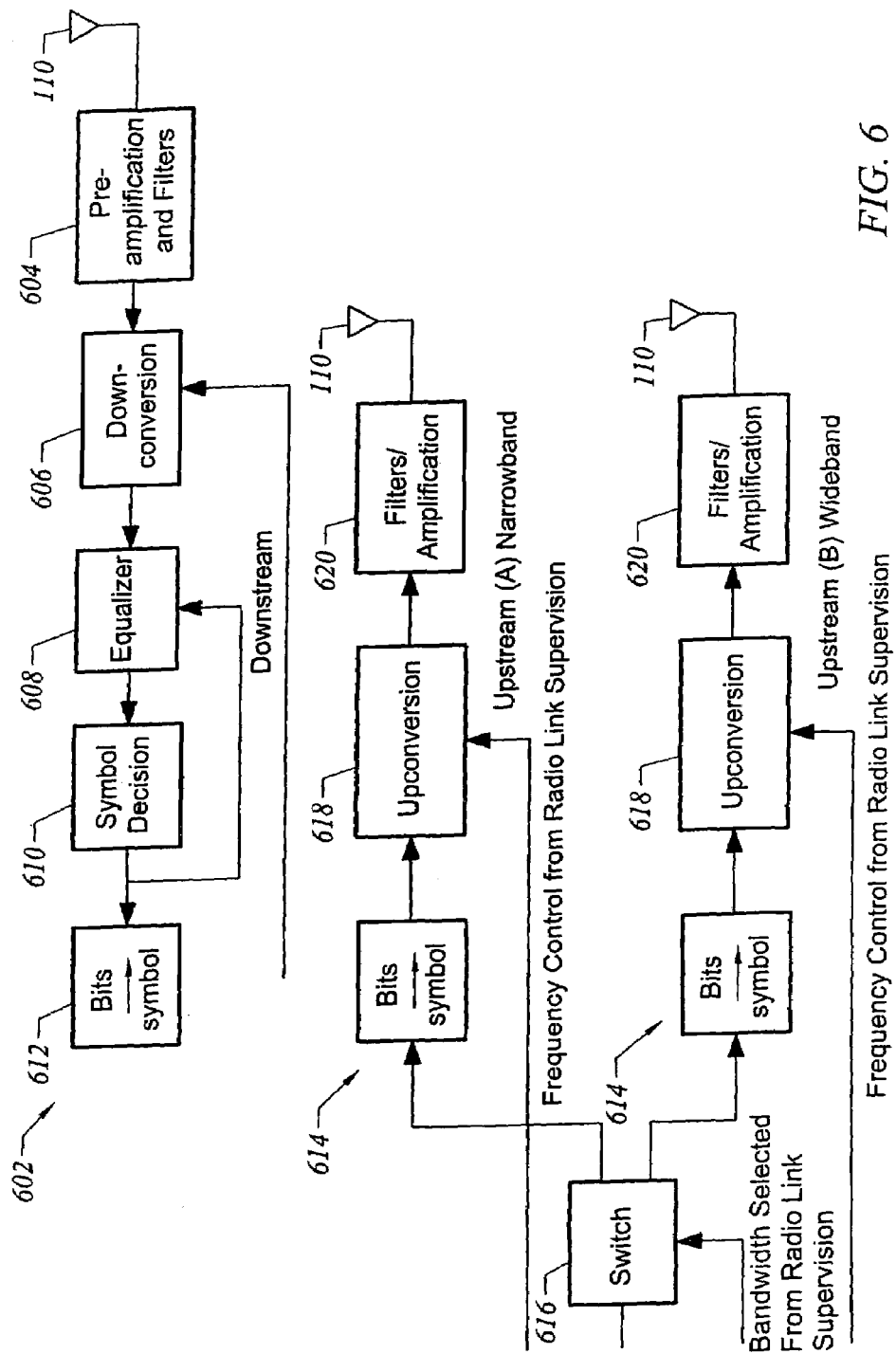
FIG. 6 depicts a data communications device radio system according to one embodiment of the present invention.

FIG. 6 depicts representative details of baseband physical layer processor 316 and radio converter 314 of CPEs 104. Again, the details are presented in the context of QAM. A downstream receiver system 602 is used to receive data from hub 102. A preamplification and filter stage 604 extracts the signal from the common transmission medium. A downconversion stage 606 converts the received signal to baseband. The reception frequency may be controlled by a signal from radio link supervision processor 320. An equalizer 608 corrects for channel distortion in the transmission medium. A symbol decision stage 610 recovers the transmitted symbols. Equalizer 608 is preferably a DFE that adapts in response to the output of symbol decision stage 610. A symbol to bit conversion stage 612 then converts the received symbols to the MAC packet data.

Two upstream transmitter systems 614 are depicted, one for the 2 Mbps transmission data rate and one for 30 Mbps. Components may be shared between the two systems. In an alternative embodiment, a single transmitter system with selectable or even fully variable data rate is used.

In the depicted system, a switch 616 selects which bandwidth is to be used during a particular frame. MAC packet data is sent to the appropriate upstream transmitter system based on the setting of switch 616. A bit to symbol conversion stage 618 converts the MAC packet data to QAM symbols. An upconversion stage 620 sets the transmission frequency based on input from radio link supervision processor 320. An amplification and filter stage 622 prepares the signal for transmission via the common transmission medium.

The multirate upstream model provided by the present invention provides high quality service to both low information rate and high information rate sources while maximizing spectral efficiency. Also, latency is minimized for real-time traffic such as voice and video conference data.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference.

What is claimed is:

1. In a digital communications network comprising a plurality of data communications devices transmitting via a common transmission medium and a hub receiving signals from said data communications devices via said common transmission medium, a method comprising:
   receiving access request messages from requesting data communication devices, said access request messages requesting access to said common transmission medium;
   allocating access to said common transmission medium in both the frequency and time domain among said requesting data communication devices; and
   transmitting from said hub to said requesting access devices, instructions for each requesting access device to transmit at particular times and frequencies, and at particular data rates chosen in accordance with allocations by a bandwidth manager.

2. The method of claim 1 wherein said common transmission medium comprises a wireless medium.

3. The method of claim 1 wherein said common transmission medium comprises a wired medium.

4. In a data communication network, a method comprising:
   transmitting requests at a bandwidth manager for access to a common transmission medium to a hub;
   receiving at a link supervisor, medium access instructions from said hub, said medium access instructions specifying data rate, transmission time, and transmission frequency for transmissions to said hub; and
   controlling at the link supervisor, transmission of information via said common transmission medium in accordance with said specified data rate, transmission time, and transmission frequency.

5. The method of claim 4 wherein said common transmission medium comprises a wired medium.

6. The method of claim 4 wherein said common transmission medium comprises a wireless medium.

7. The method of claim 6 further comprising communicating at selectable data rates with at least two downstream radios.

8. The method of claim 4 wherein said link supervisor comprises a radio link supervisor.

9. A data communications device for use in a network, said data communications device comprising:
   means for transmitting requests at a bandwidth manager for access to a common transmission medium to a hub;
   means for receiving at a link supervisor, medium access instructions from said hub, said medium access instructions specifying data rate, transmission time, and transmission frequency for transmissions to said hub; and
   means for controlling at the link supervisor, transmission of information via said common transmission medium in accordance with said specified data rate, transmission time, and transmission frequency.

10. The device of claim 9 wherein said common transmission medium comprises a wired medium.

11. The device of claim 9 wherein said common transmission medium comprises a wireless medium.

12. The device of claim 11 further comprising communicating at selectable data rates with at least two downstream radios.

13. The device of claim 9 wherein said link supervisor comprises a radio link supervisor.

* * * * *